United States Patent
Mori et al.

(10) Patent No.: US 6,504,482 B1
(45) Date of Patent: Jan. 7, 2003

(54) ABNORMALITY DETECTION APPARATUS AND METHOD

(75) Inventors: Yukio Mori, Hirakata (JP); Toshiya Iinuma, Kadoma (JP); Kenji Oyamada, Hirakata (JP); Seiji Okada, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/753,672

(22) Filed: Jan. 4, 2001

(30) Foreign Application Priority Data

Jan. 13, 2000 (JP) .................................. 2000-005105
Mar. 27, 2000 (JP) .................................. 2000-087639

(51) Int. Cl.[7] ............................................. G08B 23/00
(52) U.S. Cl. ................................... 340/573.1; 340/529
(58) Field of Search ......................... 340/573.1, 573.6, 340/573.7, 541, 529

(56) References Cited

U.S. PATENT DOCUMENTS

| | | | | |
|---|---|---|---|---|
| 3,803,572 A | * | 4/1974 | Campman | 340/555 |
| 3,812,287 A | * | 5/1974 | Lemelson | 348/155 |
| 3,816,648 A | * | 6/1974 | Noll et al. | 348/154 |
| 4,249,207 A | * | 2/1981 | Harman et al. | 348/152 |
| 6,049,281 A | * | 4/2000 | Osterweil | 340/573.4 |
| 6,084,516 A | * | 7/2000 | Yasushi et al. | 340/573.1 |
| 6,211,787 B1 | * | 4/2001 | Yoshiike et al. | 340/573.1 |
| 6,331,818 B1 | * | 12/2001 | Hiraga | 340/573.1 |

FOREIGN PATENT DOCUMENTS

JP  11-101502  * 4/1999

* cited by examiner

Primary Examiner—Thomas Mullen
(74) Attorney, Agent, or Firm—Arent Fox Kintner Plotkin Kahn

(57) ABSTRACT

An abnormality detection apparatus for detecting an event where a monitored object in a room has lapsed into an abnormal state. The apparatus includes an image pickup system for picking up an image of a scene in the room, and feature-quantity extraction devices for extracting an image feature quantity from the image picked up by the image pickup devices. The apparatus also includes judgment devices for determining whether the monitored object in the room has lapsed into the abnormal state or not based on the time-variations of the image feature quantity extracted by the feature-quantity extraction devices, and outputting an alarm that responds to the determination of the occurrence of the abnormal state.

18 Claims, 14 Drawing Sheets

ABNORMALITY DETECTION APPARATUS AND METHOD

BACKGROUND OF THE INVENTION

1. Field of the Invention

The present invention relates to an abnormality detection apparatus and method for detecting an event where, for example, a person has fallen in a room such as a bathroom, toilet or the like.

2. Prior Art

Recent years have seen an increasing number of bathroom accidents involving the deaths of persons taking bath. The number of people who died during bath use exceeds that of those who were killed in traffic accidents. Accordingly, attention is being focused on the accidents during bath use.

The direct causes of the accidental deaths during bath use are that a bath user fell because of heart failure or cerebral apoplexy and that a bath user, having lost consciousness, was drowned to death in a bath-tub. Although study has been made to investigate the causative factor of such situations, it is rather difficult to identify the causative factor under the current circumstances with changes in life styles further complicating the problem. Accordingly, it is quite difficult to prevent the occurrence of heart failure or cerebral apoplexy during bath use.

However, the chance of surviving such situations can be significantly increased by early detection although the episodes of the diseases cannot be prevented.

In this connection, Japanese Unexamined Patent Publication No.11(1999)-101502 has disclosed an abnormality detection system which operates as follows. The system monitors a bathroom to capture such a coarse image for privacy protection that only the presence of a bath user can barely be recognized, for calculation of a position of the centroid of the bath user. The system detects a motion of the bath user by sensing the movement of the centroid in order to inform a kitchen of an abnormality if the motion cannot be detected for a predetermined period of time.

In the room, however, there are usually other moving objects than the person. The other moving objects in the bathroom may be exemplified by shower water, wavering surface of hot water in the bath-tub and the like. In the prior-art system adapted to detect the motion of a person based on the coarse image, it is difficult to differentiate the motion of the person from the shower water or the wavering surface of hot water in the tub. This sometimes leads to a case where despite the cease of motion of the bath user, the system cannot detect the abnormal state of the user because it has mistaken the shower water or the wavering water surface for the motion of the user.

SUMMARY OF THE INVENTION

It is an object of the invention to provide an abnormality detection apparatus and method for high accuracy detection of an event where a person has fallen in a room such as a bathroom, toilet or the like.

In accordance with the invention, an abnormality detection apparatus for detecting an event where a monitored object in a room has lapsed into an abnormal state, the apparatus comprises image pickup means for picking up an image of a scene in the room; feature-quantity extraction means for extracting an image feature-quantity from the image picked up by the image pickup means; and judgment means for determining whether the monitored object in the room has lapsed into the abnormal state or not based on the time-variations of the image feature quantity extracted by the feature-quantity extraction means.

A usable feature-quantity extraction means is adapted to, for example, calculate the image feature quantity of each of plural feature-quantity calculation regions defined in one screen, the calculation performed on the feature-quantity calculation regions at predetermined time intervals. A usable judgment means is adapted to, for example, determine whether the monitored object in the room has lapsed into the abnormal state or not based on the time-variations of the respective image feature quantities of the feature-quantity calculation regions.

The usable judgment means comprises, for example, means for judging the respective feature-quantity calculation regions as to whether the image feature quantity is time-varied or not, the judgment made on the calculation regions at predetermined time intervals; means for determining whether the feature-quantity calculation regions determined to be time-varied in the image feature quantities are present in not less than a predetermined number or less than the predetermined number each time the judgment as to the time-variations of the image feature quantities is made; and means for determining that the monitored object has lapsed into the abnormal state when a state with less than the predetermined number of feature-quantity calculation regions determined to be time-varied in the image feature quantities has continued for a predetermined period of time.

In a case where a first alarm device is installed in the room while a second alarm device is installed outside the room, a usable judgment means comprises, for example, means for judging the respective feature-quantity calculation regions as to whether the image feature quantity is time-varied or not, the judgment made on the calculation regions at predetermined time intervals; means for determining whether the feature-quantity calculation regions determined to be time-varied in the image feature quantities are present in not less than a predetermined number or less than the predetermined number each time the judgment as to the time-variations of the image feature quantities is made; means for triggering the first alarm device when a state with less than the predetermined number of feature-quantity calculation regions determined to be time-varied in the image feature quantities has continued for a first predetermined period of time; and means for triggering the second alarm device when the state with less than the predetermined number of feature-quantity calculation regions determined to be time-varied in the image feature quantities has continued for a second predetermined period of time which is longer than the first predetermined period of time.

A usable judgment means comprises, for example, first judging means for judging the respective feature-quantity calculation regions as to whether the image feature quantity is time-varied or not, the judgment made on the calculation regions at predetermined time intervals; second judging means for determining whether feature-quantity calculation regions determined to be time-varied in the image feature quantities are present in not less than a predetermined number or less than the predetermined number each time the judgment as to the time-variations of the image feature quantities is made; and third judging means for determining whether the monitored object has lapsed into the abnormal state or not based on a predetermined number of preceding judgment results given by the second judging means.

In a case where the first alarm device is installed in the room while the second alarm device is installed outside the room, a usable judgment means comprises, for example, first judging means for judging the respective feature-quantity calculation regions as to whether the image feature quantity is time-varied or not, the judgment made on the calculation regions at predetermined time intervals; second judging means for determining whether the monitored object is in motion or not each time the judgment as to the time-variations of the image feature quantities is made, the judgment made based on whether the feature-quantity calculation regions determined to be time-varied in the image feature quantities are present in not less than a predetermined number or less than the predetermined number; means for triggering the first alarm device when a first predetermined number of preceding judgment results given by the second judging means include not more than a first predetermined number of determinations that the monitored object is in motion; and means for triggering the second alarm device when a second predetermined number of preceding judgment results given by the second judging means include not more than a second predetermined number of determinations that the monitored object is in motion.

A usable feature-quantity extraction means is adapted to, for example, calculate an average of image feature quantities for a predetermined number of fields with respect to each of plural feature-quantity calculation regions defined in one screen, the calculation performed on the calculation regions at predetermined time intervals. A usable judgment means is adapted to, for example, determine whether the monitored object in the room has lapsed into the abnormal state or not based on the time-variations of the respective average image feature quantities of the feature-quantity calculation regions.

A usable judgment means comprises, for example, means for judging the respective feature-quantity calculation regions as to whether the average image feature quantity is time-varied or not, the judgment made on the calculation regions at predetermined time intervals; means for determining whether the feature-quantity calculation regions determined to be time-varied in the average image feature quantities are present in not less than a predetermined number or less than the predetermined number each time the judgment as to the time-variations of the average image feature quantities is made; and means for determining that the monitored object has lapsed into the abnormal state when a state with less than the predetermined number of feature-quantity calculation regions determined to be time-varied in the average image feature quantities has continued for a predetermined period of time.

In a case where the first alarm device is installed in the room while the second alarm device is installed outside the room, a usable judgment means comprises, for example, means for judging the respective feature-quantity calculation regions as to whether the average image feature quantity is time-varied or not, the judgment made on the calculation regions at predetermined time intervals; means for determining whether the feature-quantity calculation regions determined to be time-varied in the average image feature quantities are present in not less than a predetermined number or less than the predetermined number each time the judgment as to the time-variations of the average image feature quantities is made; means for triggering the first alarm device when a state with less than the predetermined number of feature-quantity calculation regions determined to be time-varied in the average image feature quantities has continued for a first predetermined period of time; and means for triggering the second alarm device when the state with less than the predetermined number of feature-quantity calculation regions determined to be time-varied in the average image feature quantities has continued for a second predetermined period of time which is longer than the first predetermined period of time.

In accordance with the invention, an abnormality detection method for detecting an event where a monitored object in a room has lapsed into an abnormal state, the method comprises the steps of: a first step of picking up an image of a scene in the room via an image pickup device; a second step of extracting an image feature quantity from the image captured at the first step; and a third step of determining whether the monitored object has lapsed into the abnormal state or not based on the time-variations of the image feature quantity extracted at the second step.

The second step is adapted to, for example, calculate an image feature quantity of each of plural feature-quantity calculation regions defined in one screen, the calculation performed on the calculation regions at predetermined time intervals. The third step is adapted to, for example, determine whether the monitored object in the room has lapsed into the abnormal state or not based on the time-variations of the respective image feature quantities of the feature-quantity calculation regions.

For example, the third step comprises the steps of: judging the respective feature-quantity calculation regions as to whether the image feature quantity is time-varied or not, the judgment made on the calculation regions at predetermined time intervals; determining whether the feature-quantity calculation regions determined to be time-varied in the image feature quantities are present in not less than a predetermined number or less than the predetermined number each time the judgment as to the time-variations of the image feature quantities is made; and determining that the monitored object has lapsed into the abnormal state when a state with less than the predetermined number of feature-quantity calculation regions determined to be time-varied in the image feature quantities has continued for a predetermined period of time.

In a case where the first alarm device is installed in the room while the second alarm device is installed outside the room, the third step comprises, for example, the steps of: judging the respective feature-quantity calculation regions as to whether the image feature-quantity is time-varied or not, the judgment made on the calculation regions at predetermined time intervals; determining whether the feature-quantity calculation regions determined to be time-varied in the image feature quantities are present in not less than a predetermined number or less than the predetermined number each time the judgment as to the time-variations of the image feature quantities is made; triggering the first alarm device when a state with less than the predetermined number of feature-quantity calculation regions determined to be time-varied in the image feature quantities has continued for a first predetermined period of time; and triggering the second alarm device when the state with less than the predetermined number of feature-quantity calculation regions determined to be time-varied in the image feature quantities has continued for a second predetermined period of time which is longer than the first predetermined period of time.

For example, the third step comprises: Step 'a' of judging the respective feature-quantity calculation regions as to whether the image feature quantity is time-varied or not, the judgment made on the calculation regions at predetermined time intervals; Step 'b' of determining whether the feature-quantity calculation regions determined to be time-varied in the image feature quantities are present in not less than a predetermined number or less than the predetermined number each time the judgment as to the time-variations of the image feature quantities is made; and Step 'c' of determining whether the monitored object has lapsed into the abnormal state or not based on a predetermined number of preceding judgment results given by Step 'b'.

In a case where the first alarm device is installed in the room while the second alarm device is installed outside the room, the third step comprises, for example, Step 'a' of judging the respective feature-quantity calculation regions as to whether the image feature quantity is time-varied or not, the judgment made on the calculation regions at predetermined time intervals; Step 'b' of determining whether the feature-quantity calculation regions determined to be time-varied in the image feature quantities are present in not less than a predetermined number or less than the predetermined number each time the judgment as to the time-variations of the image feature quantities is made, thereby determining whether the monitored object has lapsed into the abnormal state or not; Step 'c' of triggering the first alarm device when a first predetermined number of preceding judgment results given by Step 'b' include not more than a first predetermined number of determinations that the monitored object is in motion; and Step 'd' of triggering the second alarm device when a second predetermined number of preceding judgment results given by Step 'b' include not more than a second predetermined number of determinations that the monitored object is in motion.

The second step is adapted to, for example, calculate an average of image feature quantities for a predetermined number of fields with respect to each of plural feature-quantity calculation regions defined in one screen, the calculation performed on the calculation regions at predetermined time intervals. The third step is adapted to, for example, determine whether the monitored object in the room has lapsed into the abnormal state or not based on the time-variations of the respective average image feature quantities of the feature-quantity calculation regions.

For example, the third step comprises the steps of: judging the respective feature-quantity calculation regions as to whether the average image feature quantity is time-varied or not, the judgment made on the calculation regions at predetermined time intervals; determining whether the feature-quantity calculation regions determined to be time-varied in the average image feature quantities are present in not less than a predetermined number or less than the predetermined number each time the judgment as to the time-variations of the average image feature quantities is made; and determining that the monitored object has lapsed into the abnormal state when a state with less than the predetermined number of feature-quantity calculation regions determined to be time-varied in the average image feature quantities has continued for a predetermined period of time.

In a case where the first alarm device is installed in the room while the second alarm device is installed outside the room, the third step comprises, for example, the steps of: judging the respective feature-quantity calculation regions as to whether the average image feature quantity is time-varied or not, the judgment made on the calculation regions at predetermined time intervals; determining whether the feature-quantity calculation regions determined to be time-varied in the average image feature quantities are present in not less than a predetermined number or less than the predetermined number each time the judgment as to the time-variations of the average image feature quantities is made; triggering the first alarm device when a state with less than the predetermined number of feature-quantity calculation regions determined to be time-varied in the average image feature quantities has continued for a first predetermined period of time; and triggering the second alarm device when the state with less than the predetermined number of feature-quantity calculation regions determined to be time-varied in the average image feature quantities has continued for a second predetermined period of time which is longer than the first predetermined period of time.

DETAILED DESCRIPTION OF PREFERRED EMBODIMENTS

[1] Explanation of First Embodiment

Figure 1:
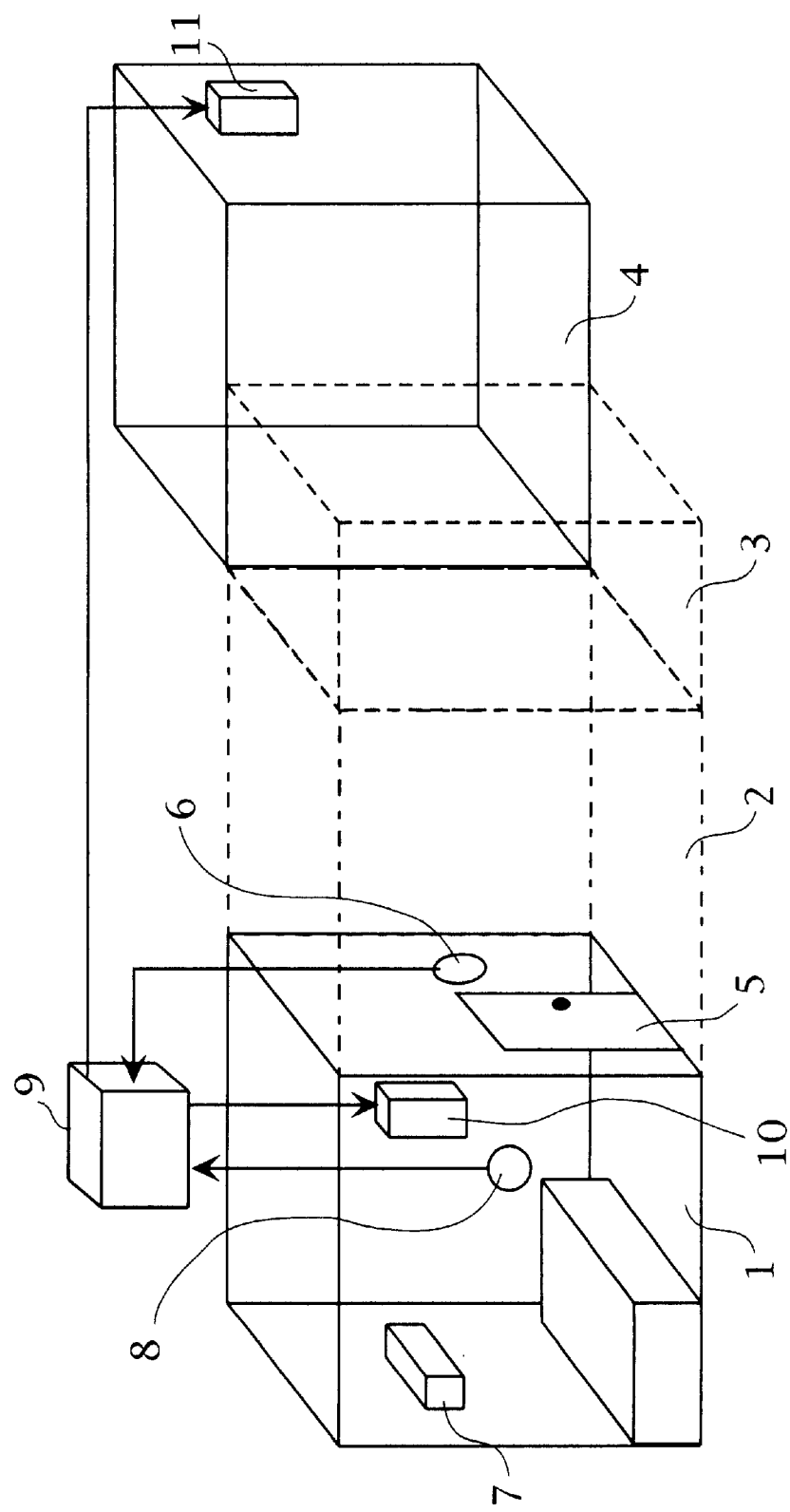
FIG. 1 is a schematic diagram showing an exemplary arrangement of an abnormality detection apparatus.

FIG. 1 is a schematic diagram showing an arrangement of an abnormality detection apparatus.

In FIG. 1, a bathroom is indicated at 1, a changing room at 2, a corridor at 3 and a kitchen at 4.

A door 5 is openably installed in a wall between the bathroom 1 and the changing room 2. The door 5 may be opened to allow a person into the bathroom 1 from the changing room 2 or vice versa.

On a changing-room 2 side surface of the wall between the bathroom 1 and the changing room 2, a light switch 6 is disposed adjacent the door 5 for turning on a light 7 in the bathroom 1. Before entering the bathroom 1, a person may manipulate the light switch 6 to turn on the light 7. The person may manipulate the light switch 6 to turn off the light 7 after leaving the bathroom 2.

A reference character 8 represents a CCD (image pickup means) for picking up an image of a scene in the bathroom 1. A reference character 9 represents an abnormality detection apparatus for detecting an abnormality based on the image picked up by the CCD 9.

A reference character 10 represents a first alarm device disposed in the bathroom 1 for giving an alarm to the person in the bathroom 1 (bath user). A reference character 11 represents a second alarm device disposed at, for example, the kitchen 4 for informing an abnormal state of the bath user to a person at place other than the bathroom 1.

Figure 2:
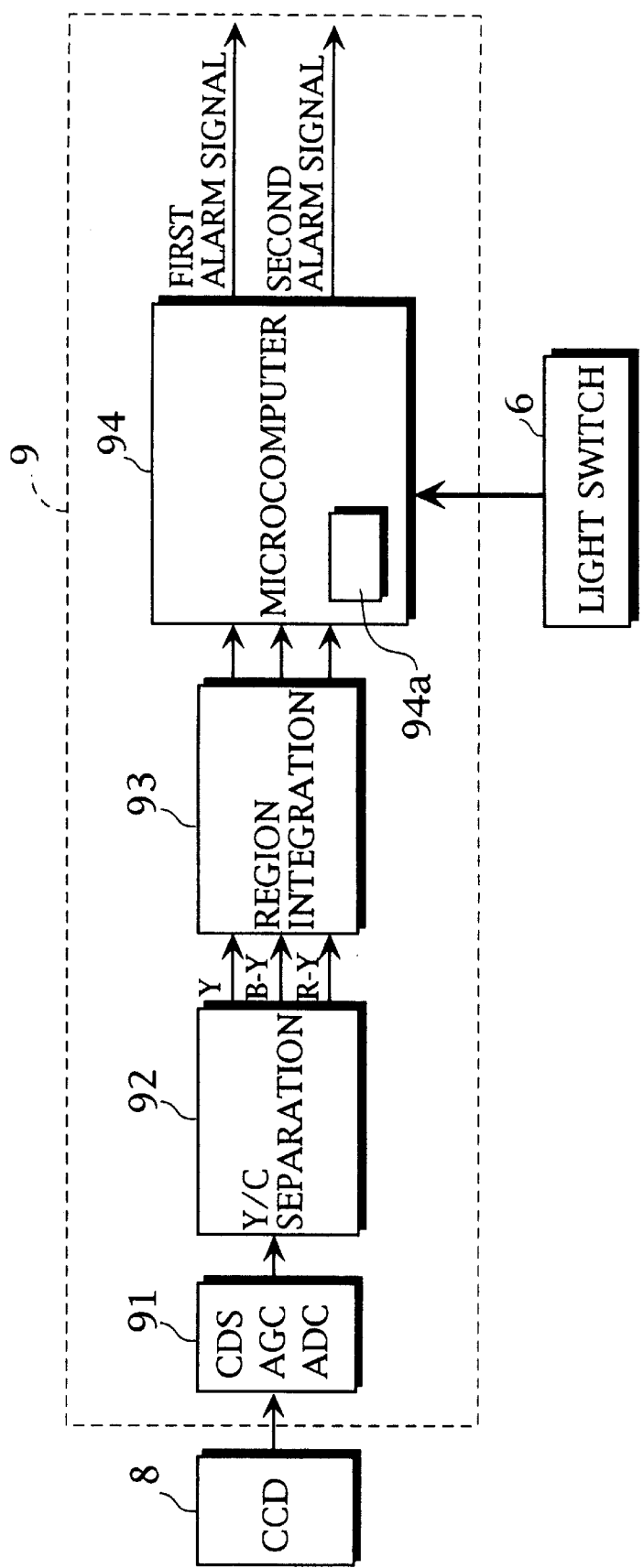
FIG. 2 is a block diagram showing a configuration of an abnormality detection apparatus.

FIG. 2 shows a configuration of the abnormality detection apparatus 9.

A reference character 91 represents pre-processing means wherein the image picked up by the CCD 8 is A/D converted through a CDS and AGC. A reference character 92 represents Y/C separation means wherein the image processed by the pre-processing means is subjected to Y/C separation. A reference character 93 represents region integration means for integrating luminance(Y) signals of each of plural feature-quantity calculation regions defined in one screen, the luminance signals separated by the Y/C separation means 92. A reference character 94 represents a microcomputer with an internal timer 94a (hereinafter referred to as "microcomputer").

Figure 3:
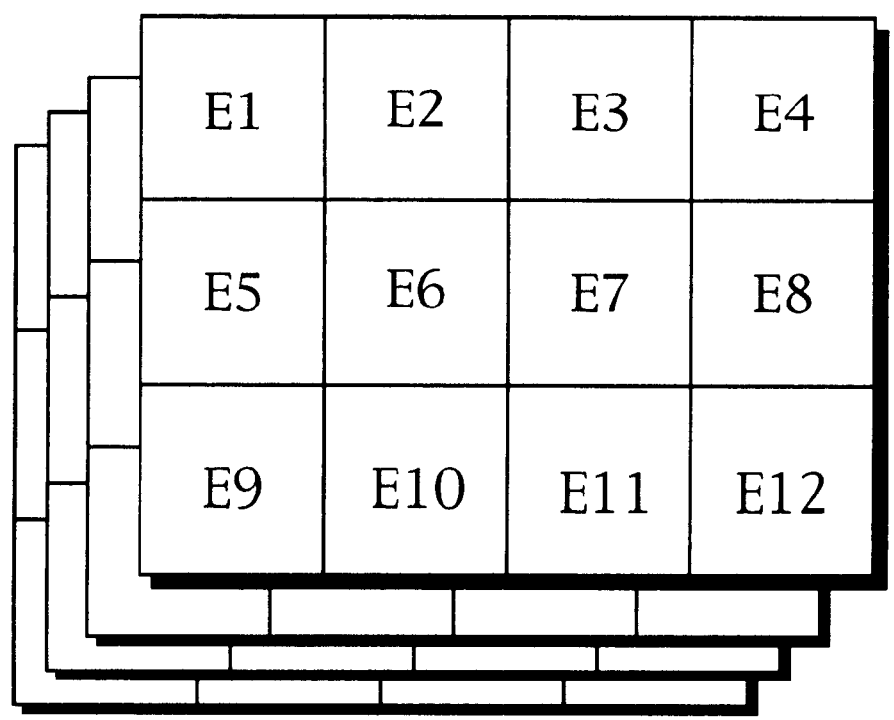
FIG. 3 is a schematic diagram showing a plurality of feature-quantity calculation regions defined in one screen.

As shown in FIG. 3, for example, the region integration means 93 calculates an integration value (hereinafter referred to as "luminance integration value") of luminance (Y) signals of each of regions E1 to E12 (feature-quantity calculation regions) defined in one screen, the luminance signals separated by the Y/C separation means 92. It is noted that the number of feature-quantity calculation regions is not limited to 12. The accuracy of the abnormality detection will be further increased if the screen is divided into the larger number of feature-quantity calculation regions decreased in size to a degree that the detection is not affected by the shower water or the wavering surface of the hot water in the bath-tub.

The microcomputer 94 senses time-variations of the luminance integration values of the respective feature-quantity calculation regions thus calculated by the region integration means 93, thereby determining that the bath user is in motion if not less than a predetermined number of feature-quantity calculation regions are time-varied in the luminance integration values, or that the bath user is motionless if not less than the predetermined number of regions are not time-varied in the luminance integration values.

A state with no motion of the bath user is monitored by means of the internal timer 94a in the microcomputer 94. After the lapse of a first time period such as of 5 minutes during which the state with no motion of the bath user has continued, the microcomputer 94 outputs a first alarm signal for triggering the first alarm device 10. After the lapse of a second time period such as of 15 minutes during which the state with no motion of the bath user has continued, the microcomputer 94 outputs a second alarm signal for triggering the second alarm device 11.

Figure 4:
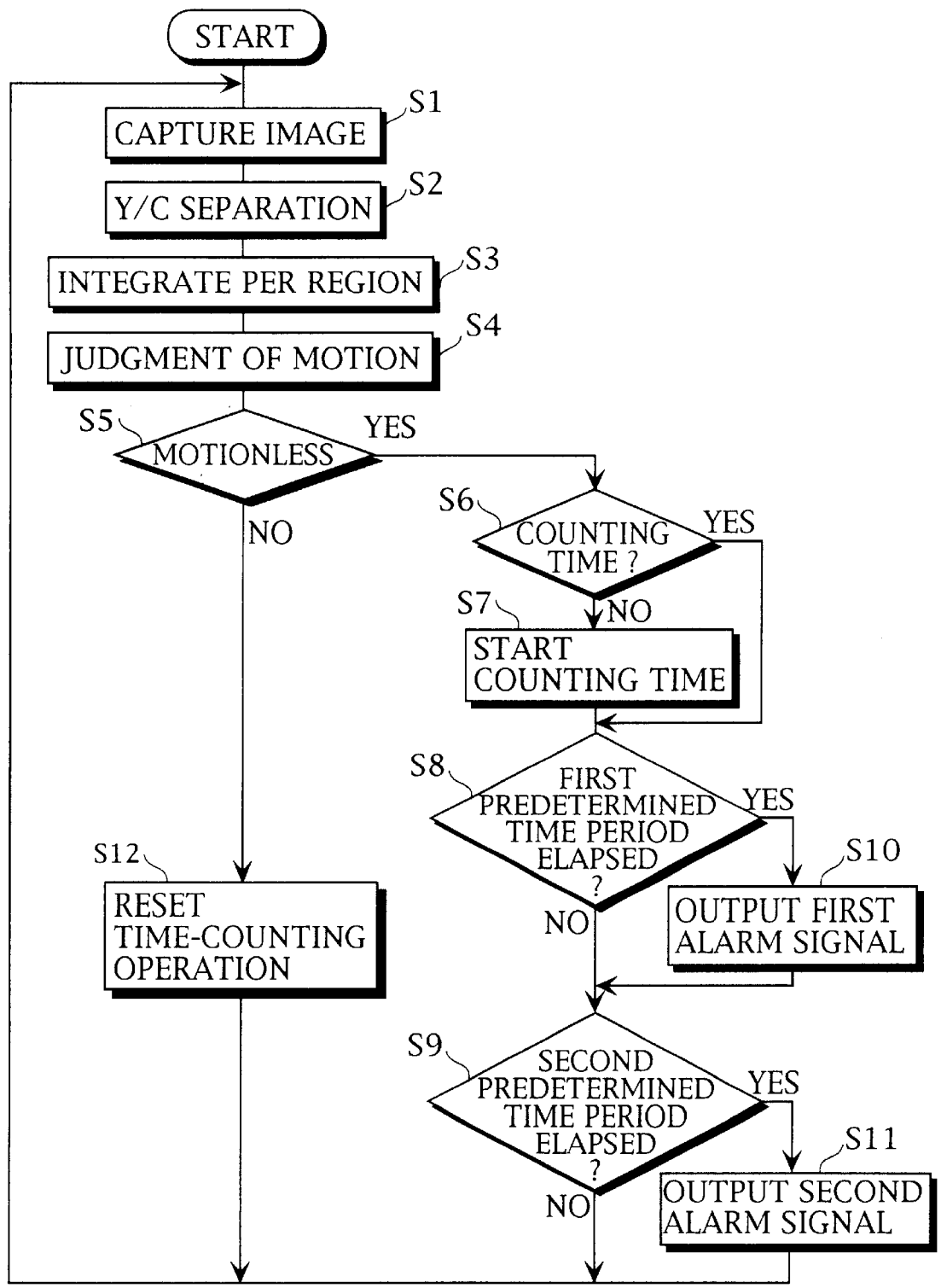
FIG. 4 is a flow chart showing an operation procedure taken by the abnormality detection apparatus according to a first embodiment of the invention.

FIG. 4 represents steps of an abnormality detection procedure taken by the abnormality detection apparatus 9.

The microcomputer 94 keeps the abnormality detection apparatus 9 performing the operations during the time between turning on and turning off of the light 7 in the bathroom 1 by way of the light switch 6.

First, an image of a scene in the room is captured by the pre-processing means 91 through the CCD 8 (Step S1). The image captured into the pre-processing means 91 is sent to the Y/C separation means 92 where Y-signal is separated from C-signal (Step S2). The region integration means 93 integrates the luminance (Y) signals of each of the feature-quantity calculation regions (Step S3).

The microcomputer 94 determines whether the bath user is in motion or not based on the time-variations of the respective luminance integration values of the feature-quantity calculation regions so calculated by the region integration means 93 (Step S4).

Specifically, it is determined that the bath user is in motion if, out of the feature-quantity calculation regions, not less than a predetermined number, say three, of regions are determined to be time-varied in the luminance integration values. If less than three regions are time-varied in the luminance integration values, it is determined that the bath user is motionless.

Instead of calculating the luminance-signal integration value of each of the feature-quantity calculation regions, a color-difference-signal integration value may be calculated on a region-by-region basis. Alternatively, each of the feature-quantity calculation regions may be calculated for both the luminance-signal integration value and the color-difference-signal integration value such that whether the bath user is in motion or not may be determined based on either of the integration values presenting the time-variations.

If the microcomputer 94 determines that the bath user is in motion (Step S5), the microcomputer 94 resets a time-counting operation of the internal timer 94a (if it is performing the time-counting operation) (Step S12) and then returns the control to Step S1.

If it is determined at Step S5 that the bath user is motionless, then judgment is made as to whether the internal timer 94a is performing the time-counting operation or not (Step S6). If the time-counting operation is underway, the control proceeds to Step S8. If the time-counting operation is not being performed, the internal timer 94a is caused to start the time-counting operation (Step S7) and then the control proceeds to Step S8.

In steps subsequent to Step S8 (inclusive), the microcomputer 94 makes determinations as to whether a time counted by the internal timer 94a exceeds the first predetermined time period or not (Step S8) and as to whether or not a time counted by the internal timer 94a exceeds the second predetermined time period which is longer than the first predetermined time period (Step S9).

If the time counted by the internal timer 94a exceeds the first predetermined time period, the microcomputer 94 outputs the first alarm signal so as to trigger the first alarm device 10 in the bathroom 1 for alerting the bath user in the bathroom 1 (Step S10).

If the time counted by the internal timer 94a exceeds the second predetermined time period, the microcomputer 94 determines that the bath user has lapsed into an abnormal state in the bathroom 1, outputting the second alarm signal for triggering the second alarm device 11 installed at place other than the bathroom, such as the kitchen 4, thereby informing an emergency situation to a person at place outside the bathroom (Step S11).

The alarm at Step S10 is given for the purpose of awakening the bath user who may have fallen asleep in the bathroom 1. The alarm at Step S11 is given to inform the emergency situation to someone outside the bathroom because it is determined that the bath user has lapsed into the abnormal state, such as loss of consciousness.

The abnormal state of the bath user can be detected by repeating the above steps in cycles.

Figure 5A:
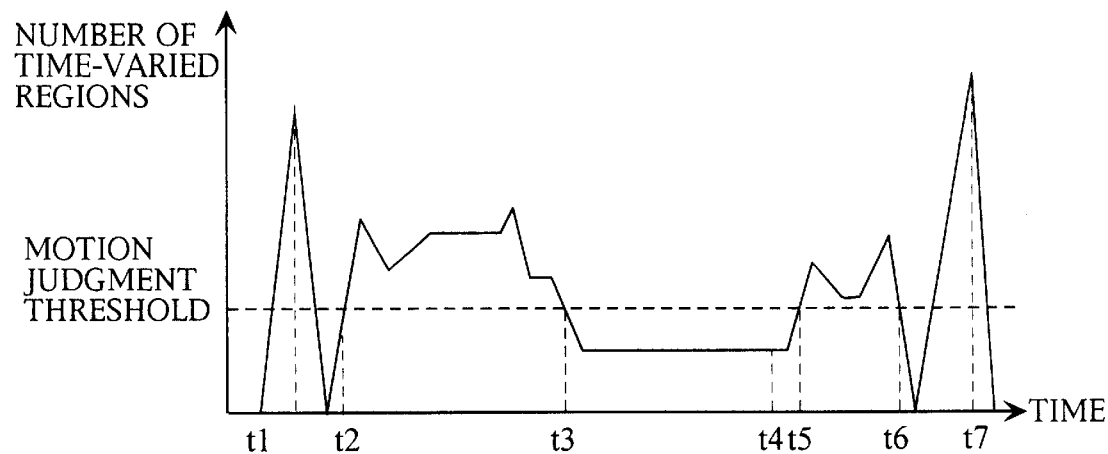
FIG. 5a is a timing chart showing an example where a bath user has fallen asleep in a bathroom 1.
Figure 5B:
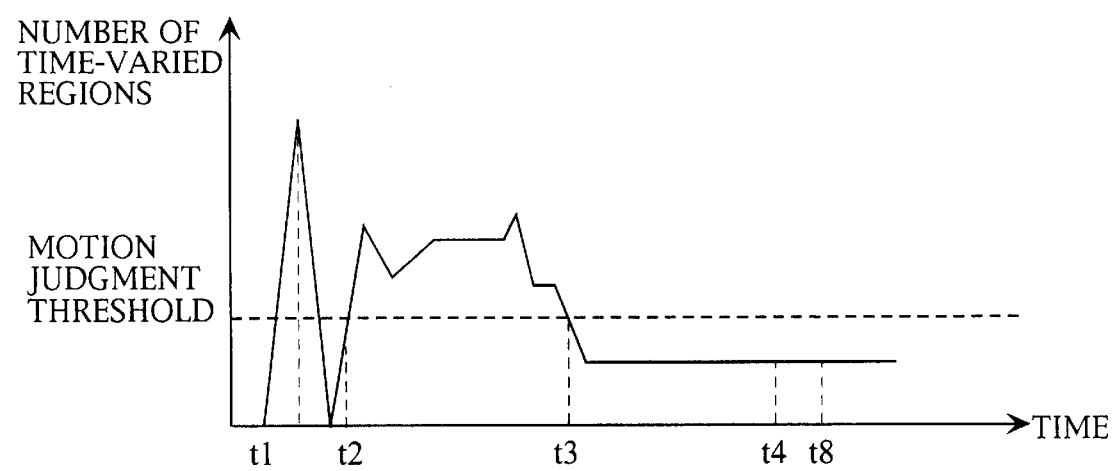
FIG. 5b is a timing chart showing an example where a bath user has lapsed into an abnormal state in the bathroom 1.

FIGS. 5a and 5b illustrate specific examples of detected situations.

FIG. 5a illustrates a case where the bath user has fallen asleep in the bathroom 1 whereas FIG. 5b illustrates a case where the bath user has lapsed into the abnormal state. It is noted that the term "motion judgment threshold" in the figures is defined as a threshold for determining whether the number of regions time-varied in the luminance integration values is not less than three or less than three.

Referring to FIG. 5a, the bath user turns ON the light switch 6 at Time t1. At this time, the microcomputer 94 causes the abnormality detection apparatus 9 to start the operations. When the bath user turns ON the light switch 6, the luminance is varied due to the illuminated light 7. Accordingly, almost all the feature-quantity regions are temporarily determined to be time-varied in the luminance integration values. Subsequently, it is determined that there is no motion of the bath user because the luminance integration values are not time-varied until the bath user enters the bathroom 1.

At Time t2 when the door 5 is opened to allow in the bath user and closed, an increased number of regions are determined to be time-varied in the luminance integration values and hence, it is determined that the bath user is in motion.

After entering the bathroom, the bath user takes motions such as dashing hot water over his/her body and the like. Thus, for some time thereafter, a state continues wherein the bath user is determined to be in motion. Subsequently, at Time t3 when the bath user sits in the bath-tub, the motion of the bath user decreases so that the number of regions time-varied in the luminance integration values is correspondingly decreased. Therefore, it is determined that the bath user is motionless. Accordingly, the internal timer 94a of the microcomputer 94 starts a time counting operation at Time t3.

At Time t4 or after the lapse of the first predetermined time period, say 5 minutes, from Time t3, the microcomputer 94 outputs the first alarm signal to the first alarm device 10 for giving an alarm to the bath user in the bathroom 1 in order that the bath user may be awakened if he/she has fallen asleep.

In response to the alarm given by the first alarm device 10, the bath user starts moving. At Time t5, the number of regions time-varied in the luminance integration values exceeds the motion judgment threshold so that it is determined that the bath user is in motion. At Time t6, the bath user leaves the bathroom 1, opening and closing the door 5. Subsequently at Time t7, the light 7 is turned off by means of the light switch 7. At this time, the microcomputer 94 terminates the operations of the abnormality detection apparatus 9.

Next, operations shown in FIG. 5b will be described. It is noted that the same operations as in FIG. 5a are done during the period between Time t1 and Time t4 and therefore, the description thereof is dispensed with. If the bath user becomes unconscious after Time t3, the bath user cannot respond to the alarm given in the bathroom 1 at Time t4. Therefore, at Time t8 or after the lapse of the second predetermined time period from Time t3, the microcomputer 94 outputs the second alarm signal for giving an alarm through the second alarm device 11 installed at the kitchen 4. At the alarm of the second alarm device 11, a person at place other than the bathroom 1 recognizes an abnormal state, going to the bathroom 1 to check what situation the bath user is in. This results in an early detection of the abnormal state of the bath user.

[2] Explanation of Second Embodiment

In a second embodiment, an abnormality detection apparatus is arranged the same way as in FIG. 1 and is configured the same way as in FIG. 2.

Figure 6:
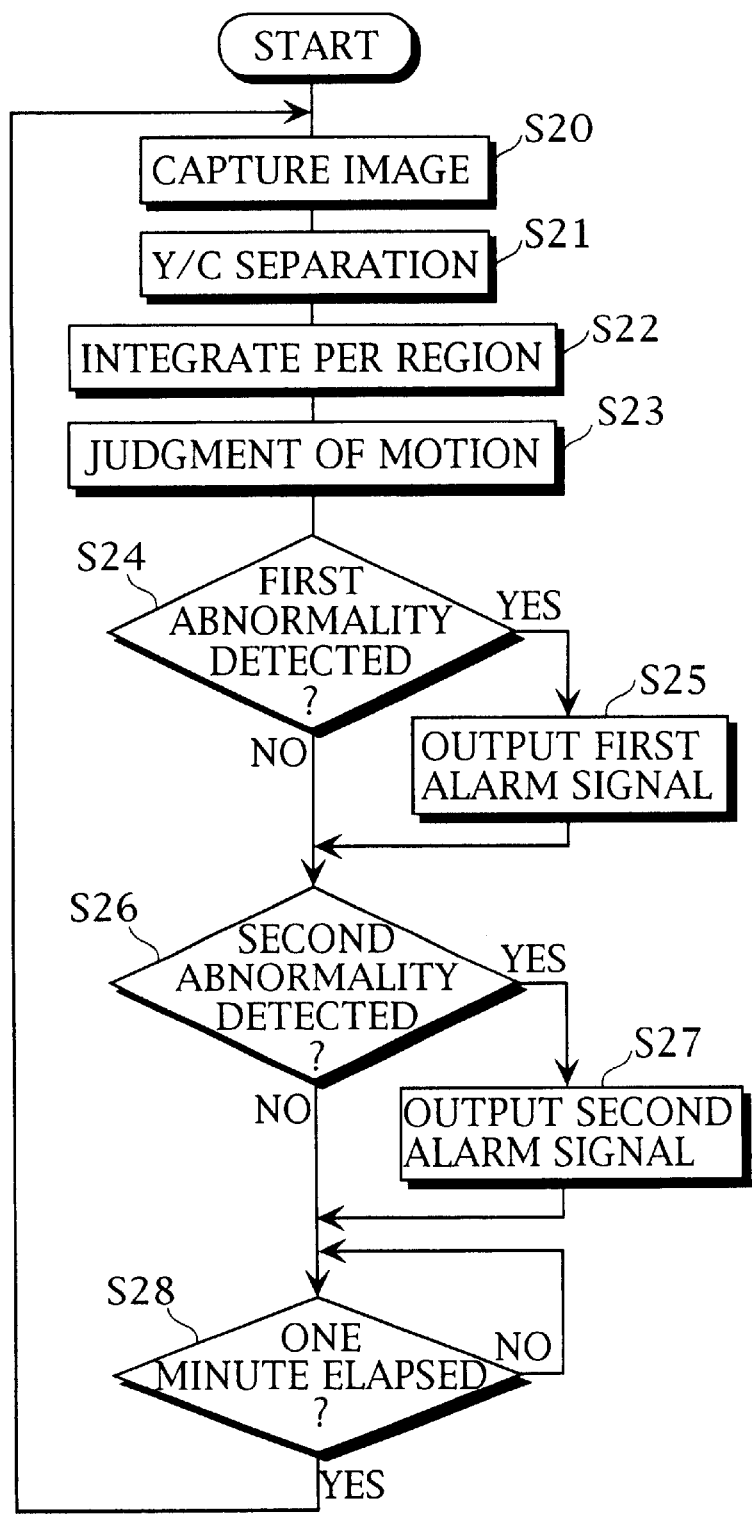
FIG. 6 is a flow chart showing an operation procedure taken by the abnormality detection apparatus according to a second embodiment hereof.

FIG. 6 shows operations of the abnormality detection apparatus.

First, an image of a scene of the room is captured into the pre-processing means 91 via the CCD 8 (Step S20). As described hereinlater, this embodiment is adapted to capture images at intervals of one minute. The image captured at Step S20 is sent to the Y/C separation means 92 for Y/C separation (Step S21). The region integration means 93 integrates the luminance signals of each of the feature-quantity calculation regions (Step S22). The microcomputer 94 determines whether the bath user is in motion or not based on the time variations of the respective luminance integration values of the feature-quantity calculation regions so calculated by the region integration means 93 (Step S23). The latest results and a predetermined number of results precedent thereto are stored.

At Step S24, the microcomputer 94 determines whether or not judgments made at Step S23 in the first predetermined time period from the present point of time, say in the last 10 minutes, include not more than a predetermined number, say three, of determinations that the bath user is in motion. If the judgments made in the last 10 minutes include not more than three determinations that the bath user is in motion, the microcomputer 94 determines that a first abnormal state is present, outputting the first alarm signal for triggering the first alarm device 10 (Step S25).

At Step S26, the microcomputer 94 determines whether or not, judgments made at Step S23 in the second predetermined time period from the present point of time, say in the last 15 minutes, include not more than a second predetermined number, say three, of determinations that the bath user is in motion. If the judgments made in the last 15 minutes include not more than three determinations that the bath user is in motion, the microcomputer 94 determines that a second abnormal state is present, outputting the second alarm signal for triggering the second alarm device 11 (Step S27).

Step S28 places the operations in a standby state until the internal timer 94a of the microcomputer 94 counts up to one minute so that the image may be captured at intervals of one minute.

Malfunctions caused by noises of the captured image or in the abnormality detection apparatus 9 can be reduced by repeating the operations of Steps S20 to S28 in cycles. Thus is accomplished the early detection of the abnormal state of the bath user in the bathroom 1.

The first and second embodiments have been described by way of examples where the abnormal state of the person in the bathroom (bath user) is detected. However, the invention is also applicable to the detection of an abnormal state of a person in a room of a house, such as a toilet, living room and the like.

According to the above embodiments, it is determined that the bath user has lapsed into the abnormal state when the bath user has continued to be motionless for a predetermined period of time. However, it is conceivable that the bath user may writhe in distress on the bathroom floor when some abnormality occurs to him/her.

As an approach to deal with this situation, the abnormal state of the bath user may be detected in the following manner. The feature-quantity calculation regions in FIG. 3 are divided into an upper group and lower group. Even if the number of regions time-varied in the integration values exceeds the motion judgment threshold, it is further determined whether the time-variations of the integration values are limited to the lower region group or not. If the time-variations of the integration values are observed only in the lower region group, it is determined that the bath user may be writhing in distress on the bathroom floor. That is, the bath user is determined to be motionless.

Since the time during which a person uses the bathroom may often vary from family to family, it is desirable that a user is permitted to set the first and second predetermined time periods of Steps S8 and S9 as well as the first and second predetermined time periods of Steps S24 and S26.

[3] Explanation of Third Embodiment

In a third embodiment, an abnormality detection apparatus is arranged the same way as in FIG. 1 and is configured the same way as in FIG. 2.

Figure 7:
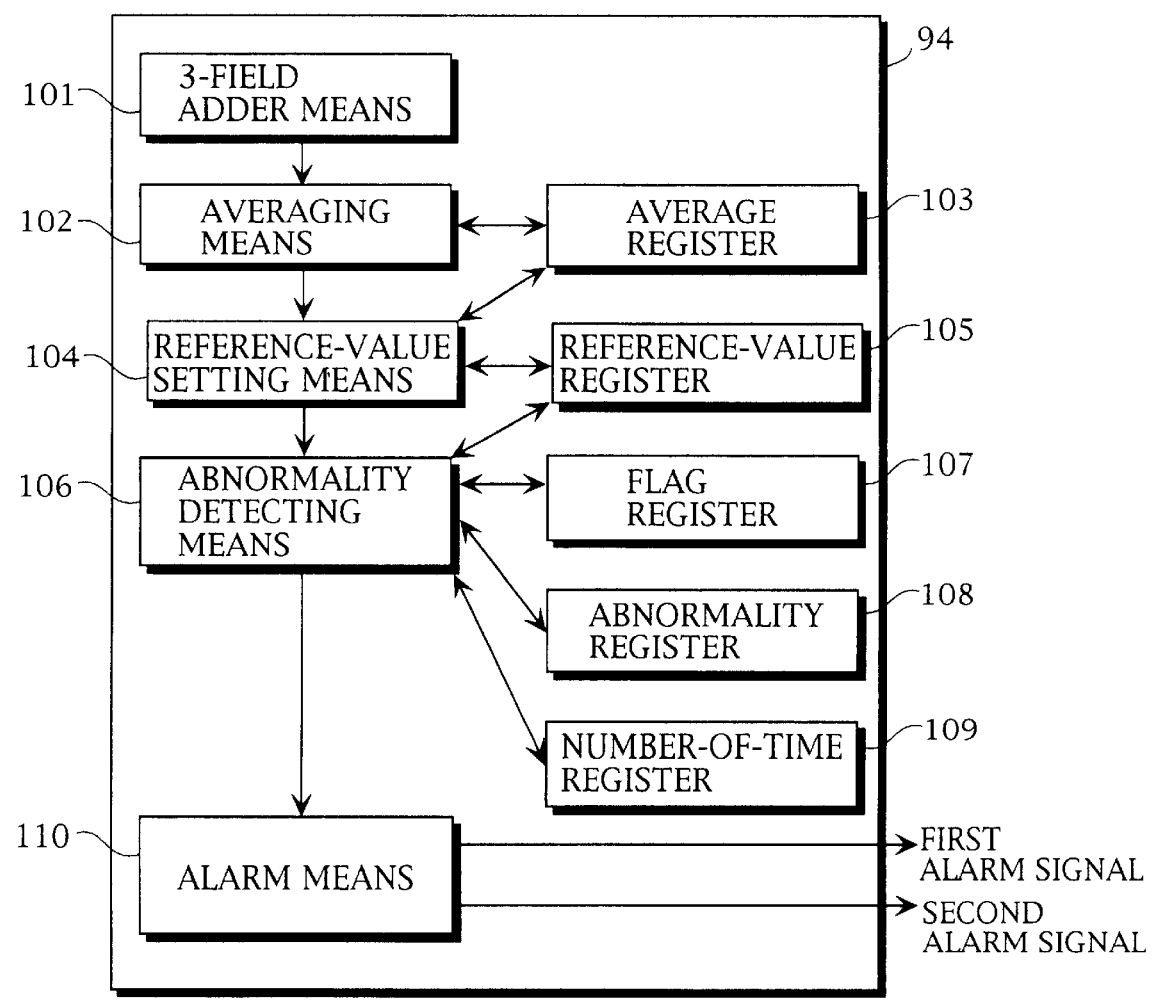
FIG. 7 is a block diagram showing functions of a microcomputer according to a third embodiment hereof.

FIG. 7 shows functions of the microcomputer 94. A reference character 101 represents 3-field adder means for adding up luminance integration values over three fields with respect to each of the feature-quantity calculation regions. A reference character 102 represents averaging means which calculates a per-field average (hereinafter referred to as "luminance average") of each of the feature-quantity calculation regions based on the 3-field luminance integration value for each feature-quantity calculation region thus obtained by the 3-field adder means 101. The averaging means 102 records the calculation results in an average register 103.

Where the light operates on the utility power at 50 Hz, there is a difference of about 10 Hz between the utility power and a frame period of the image pickup. This results in the flickering of the light, which causes the variations of luminance. This involves a possibility of an erroneous determination that the bath user is in motion. As a preventive measure against such an erroneous determination, the 3-field adder means adds up the luminance integration values over three fields on a region-by-region basis and the averaging means calculates the per-field luminance average for each feature-quantity calculation region.

Although this embodiment obtains the per-field luminance average from the 3-field luminance integration value, the calculation of per-field luminance average may not necessarily be based on the 3-field luminance integration value. The per-field luminance average may be obtained from a luminance integration value over three or more fields, say six fields, nine fields and such.

A reference character 104 represents reference-value setting means which sets the luminance average per feature-quantity calculation region as a reference value for abnormality detection, the luminance average per calculation region recorded in the average register 103. Then, the reference-value setting means records the established reference value in a reference-value register 105. A reference character 106 represents abnormality detecting means for detecting an abnormal state based on the respective luminance averages of the feature-quantity calculation regions given by the averaging means 102 and on the respective reference values of the feature-quantity calculation regions recorded in the reference-value register 105. The abnormality detecting means 106 includes a flag register 107, an abnormality register 108 and a number-of-time register 109. A reference character 110 represents alarm means for outputting the first or second alarm signal when the abnormality detecting means 106 successively detects an abnormal state not less than a predetermined number of times.

Figure 9:
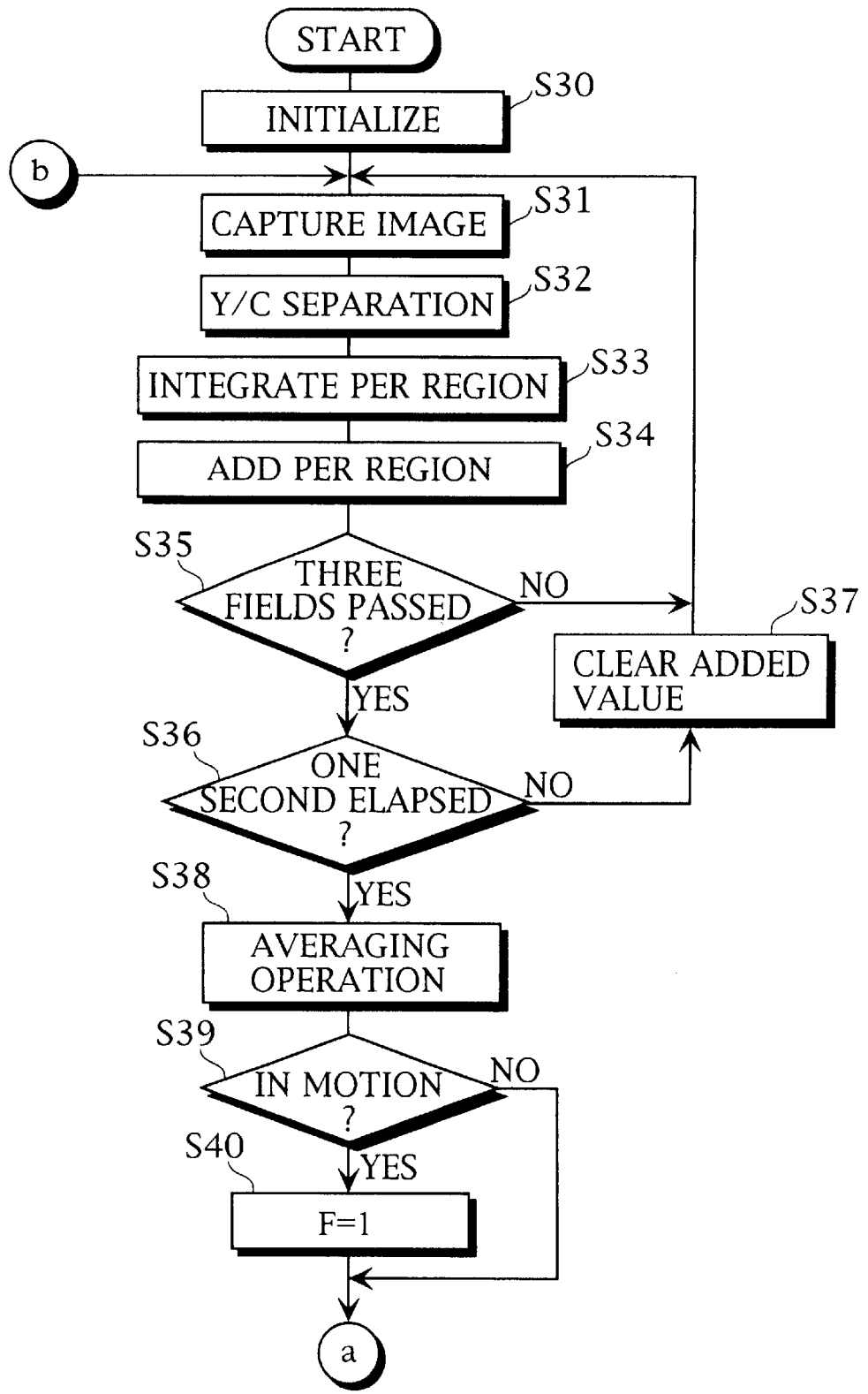
FIG. 9 is a flow chart showing an operation procedure taken by the abnormality detection apparatus according to the third embodiment.
Figure 10:
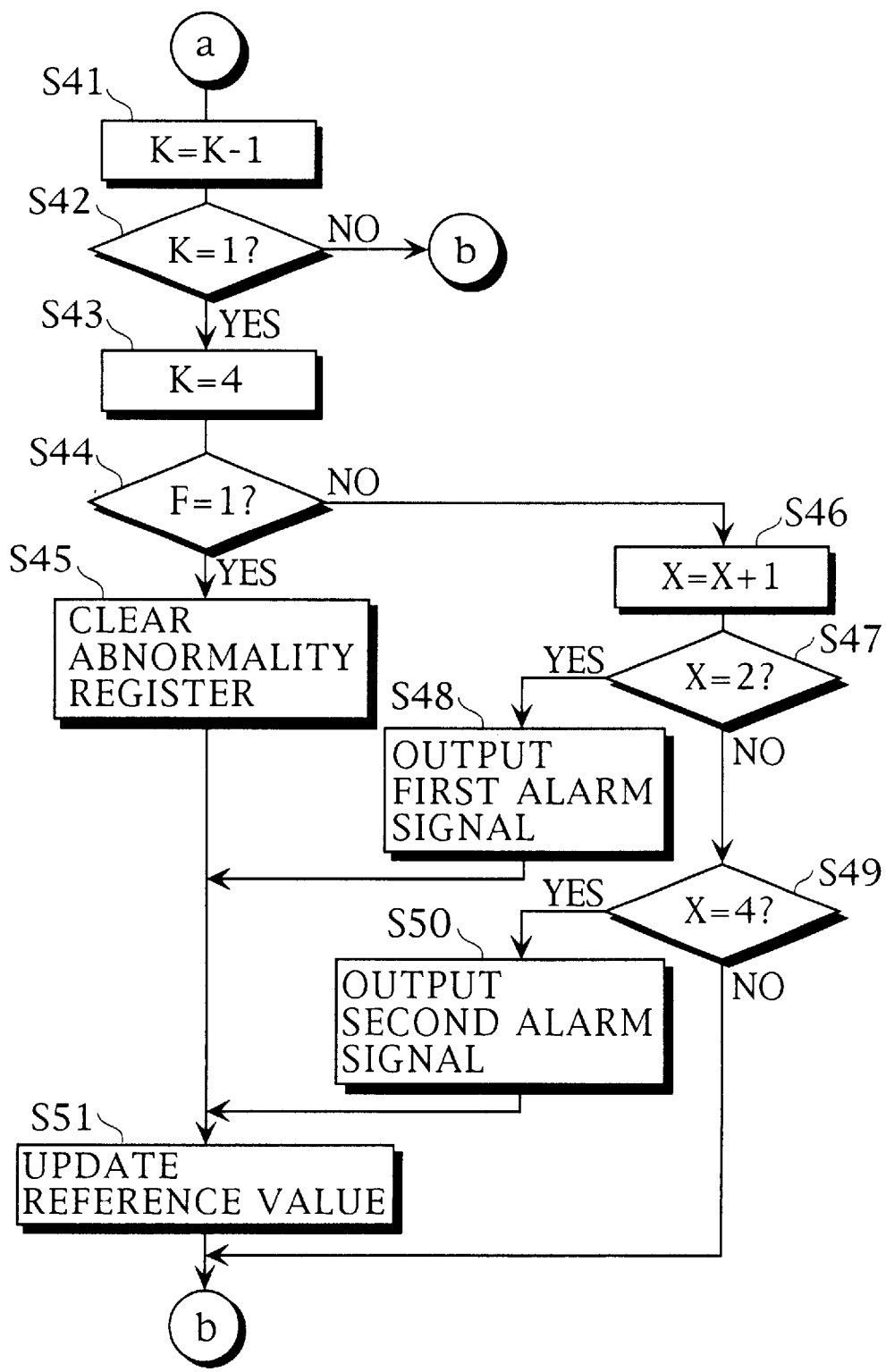
FIG. 10 is a flow chart showing the operation procedure taken by the abnormality detection apparatus according to the third embodiment.

FIGS. 9 and 10 show operations of the abnormality detection apparatus.

First, the apparatus is initialized (Step S30). Specifically, an initial reference value is established in the reference-value register 105. On the other hand, the flag register 107 and the abnormality register 108 are set to "0". Further, the number-of-time register 109 is set to "4" as the number of times K.

Next, an image of a scene in the room is captured into the pre-processing means 91 via the CCD 8 (Step S31). The image captured in the pre-processing means 91 is sent to the Y/C separation means 92 for Y/C separation (Step S32). The region integration means 93 integrates luminance signals of each of the feature-quantity calculation regions (Step S33).

Next, the adder means 101 of the microcomputer 94 adds up the luminance integration values over three fields with respect to each of the feature-quantity calculation regions (Step S34). When three fields of images have been captured (Step S35), the control proceeds to Step S36. If three fields of images have not been captured (Step S35), the control returns to Step S31.

When the processings at Steps S31 to S35 have been repeated in three cycles or the adder means 101 has added up the luminance integration values over three fields on region-by-region basis, the control proceeds to Step S36.

At Step S36, judgment is made as to whether or not one second has elapsed from the previous execution of Step S38 which will be described hereinlater. If it is determined that one second has not elapsed from the previous execution of step S38, the control proceeds to Step S37 to reset the added value given by the adder means 101. Subsequently, the control returns to step S31 to restart the image capturing operation. If it is determined that one second has elapsed from the previous execution of Step S38, the control proceeds to Step S38. It is noted that when Step S35 gives a first "YES" after the start of the operations of the abnormality detection apparatus, the control proceeds from Step S36 to Step S38.

At Step S38, the averaging means 102 calculates a per-field luminance average for each of the feature-quantity calculation regions based on the 3-field luminance integration value per region given by the adder means 101. The averaging means records the calculation results in the average register 103.

Figure 8:
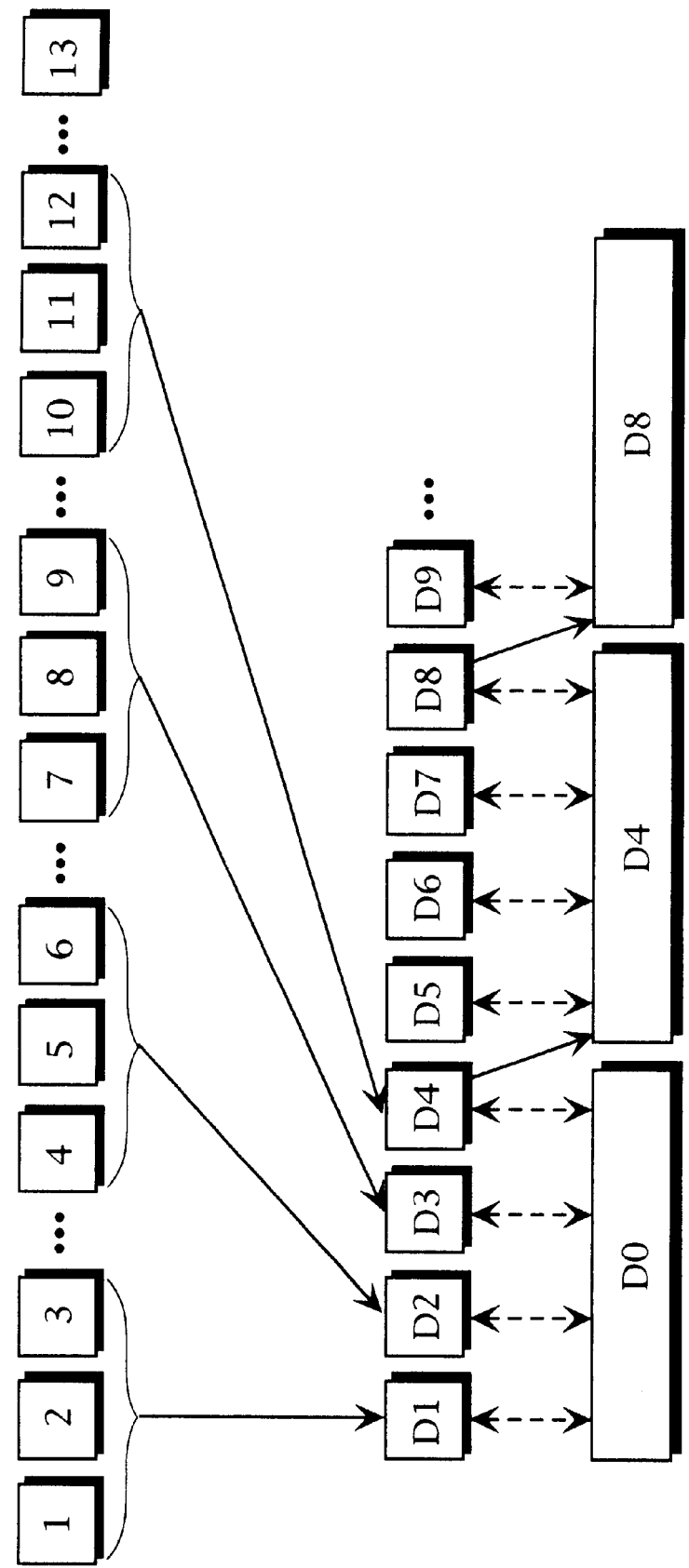
FIG. 8 is a time sequence chart explanatory of the operations of the abnormality detection apparatus according to the third embodiment.

Specifically, as shown in FIG. 8, a per-field luminance average D1 is calculated from integration values for three fields of luminance signals 1, 2, 3. After the lapse of one second, a per-field luminance average D2 is calculated from integration values for three fields of luminance signals 4, 5, 6. Subsequently, the same step is repeated at intervals of one second thereby obtaining the per-field luminance average from the integration values for three fields of luminance signals.

Next, the abnormality detecting means 106 compares the respective reference values of the feature-quantity calculation regions recorded in the reference-value register 105 with the respective luminance averages of the feature-quantity calculation regions recorded in the average register 103 so as to determine whether each of the feature-quantity calculation regions is varied in luminance or not. Based on the judgment results for the respective feature-quantity calculation regions, the detecting means determines whether the bath user is in motion or not (Step S39). For instance, if three or more regions are varied in luminance, it is determined that the bath user is in motion. If the luminance variations are observed in less than three regions, the bath user is determined to be motionless.

If it is determined that the bath user is motionless, the control proceeds to Step S41. If the bath user is determined to be in motion, the abnormality detecting means 106 sets the flag register 107 to "1" (F=1). Then, the control proceeds to Step S41.

At Step S41, the abnormality detecting means 106 decrements by one the number of times K recorded in the number-of-time register 109. Then, the abnormality detecting means 106 determines whether the number of times K is equal to "1" or not (Step S42). If not K=1, the abnormality detecting means 106 returns the control to Step S31 to restart the image capturing operation. If K=1, the abnormality detecting means 106 sets the number-of-time register 109 to "4" as the number of times K (Step S43), and then determines whether "1" is recorded in the flag register 107 or not (Step S44).

Specifically, it is determined whether or not four judgment results as to the motion of the bath user include at least one determination that the bath user is in motion, the four motion judgments individually based on the comparison between an initial reference value D0 and each of the four luminance averages D1, D2, D3 and D4, as shown in FIG. 8.

When determining at Step S44 that "1" is recorded in the flag register 107, the abnormality detecting means 106 clears the content of the abnormality register 108 (Step S45). Subsequently, the reference value is updated (Step S51). Specifically, a current average value recorded in the average register 103 is recorded, as the new reference value, in the reference-value register 105 by means of the reference-value setting means 104. Subsequently, the control returns to Step 331 to restart the image capturing operation.

Assume that the four motion judgments as to the bath user have been done based on the averages D1, D2, D3 and D4 at Step S39, the average D4 currently recorded in the average register 103 is recorded, as the new reference value, in the reference-value register 105, as shown in FIG. 8.

When determining at Step S44 that "1" is not recorded in the flag register 107 or that all the four motion judgments determines the bath user to be motionless, the abnormality detecting means 106 increments the abnormality register 108 by "1", for the number of times X of abnormality detection (Step S46).

Then, the abnormality detecting means determines whether the content X of the abnormality register 108 is "2" or not (Step S47). If X=2, the abnormality detecting means 106 causes the alarm means 110 to output the first alarm signal (Step S48). This triggers the first alarm device 10 for alerting the person in the bathroom. After updating the reference value (Step S51), the control returns to Step S31 to restart the image capturing operation.

If not X=2, the abnormality detecting means 106 determines whether the content X of the abnormality register 108 is "4" or not (Step S49). If X=4, the abnormality detecting means 106 causes the alarm means 110 to output the second alarm signal (Step S50). This triggers the second alarm device 11 for informing a person at place other than the bathroom (room), such as a kitchen, that the person in the bathroom has lapsed into the abnormal state. After updating the reference value (Step S51), the control returns to Step S31 to restart the image capturing operation.

If not X=4, the reference value is updated (Step S51) and then the control returns to Step S31 to restart the image capturing operation.

The abnormality of the person in the bathroom is detected by repeating Steps S30 to S51 in cycles. Particularly, this embodiment is adapted to capture the reference image data at intervals of one second such that even a slow motion of an elderly person can be adequately detected. Thus is accomplished the detection of the abnormal state of such a person.

[4] Explanation of Fourth Embodiment

In a fourth embodiment, an abnormality detection apparatus is arranged the same way as in FIG. 1 and is configured the same way as in FIG. 2.

Figure 11:
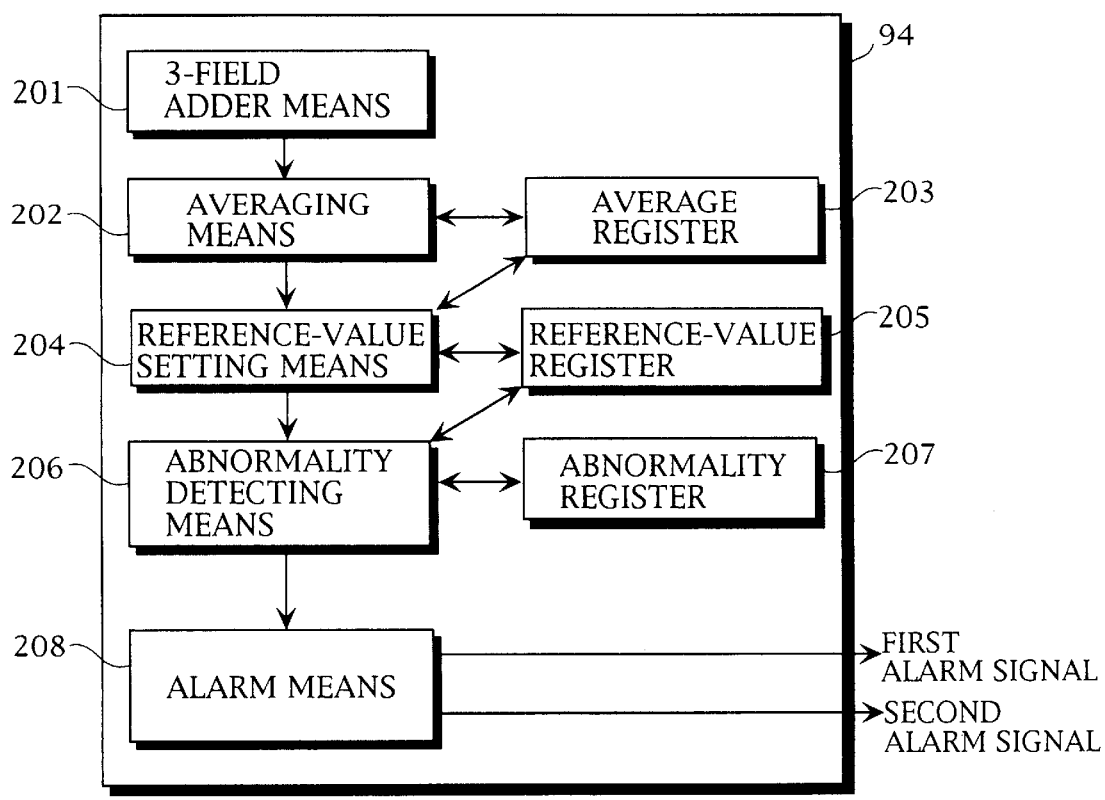
FIG. 11 is a block diagram showing the functions of a microcomputer according to a fourth embodiment hereof.

FIG. 11 illustrates functions of the microcomputer 94.

A reference character 201 represents 3-field adder means for adding up luminance integration values over three fields with respect to each of the feature-quantity calculation regions. A reference character 202 represents averaging means which calculates a per-field luminance average for each of the feature-quantity calculation regions (hereinafter referred to as "luminance average") based on the 3-field luminance integration value for each of the feature-quantity calculation regions thus obtained by the 3-field adder means 101. The averaging means records the calculation results in an average register 203.

A reference character 204 represents reference-value setting means which sets the luminance average per feature-quantity calculation region as a reference value for abnormality detection, the luminance average per calculation region recorded in the average register 203. The reference-value setting means records the established reference value in a reference-value register 205. A reference character 206 represents abnormality detecting means for detecting an abnormal state based on the luminance average given by the averaging means 202 and on the reference value per feature-quantity calculation region recorded in the reference-value register 205. The abnormality detecting means 106 includes an abnormality register 207.

A reference character 208 represents alarm means for outputting the first alarm signal as an in-room alarm signal or the second alarm signal as an exo-room alarm signal when an abnormal state is detected by the abnormality detecting means 206.

Figure 13:
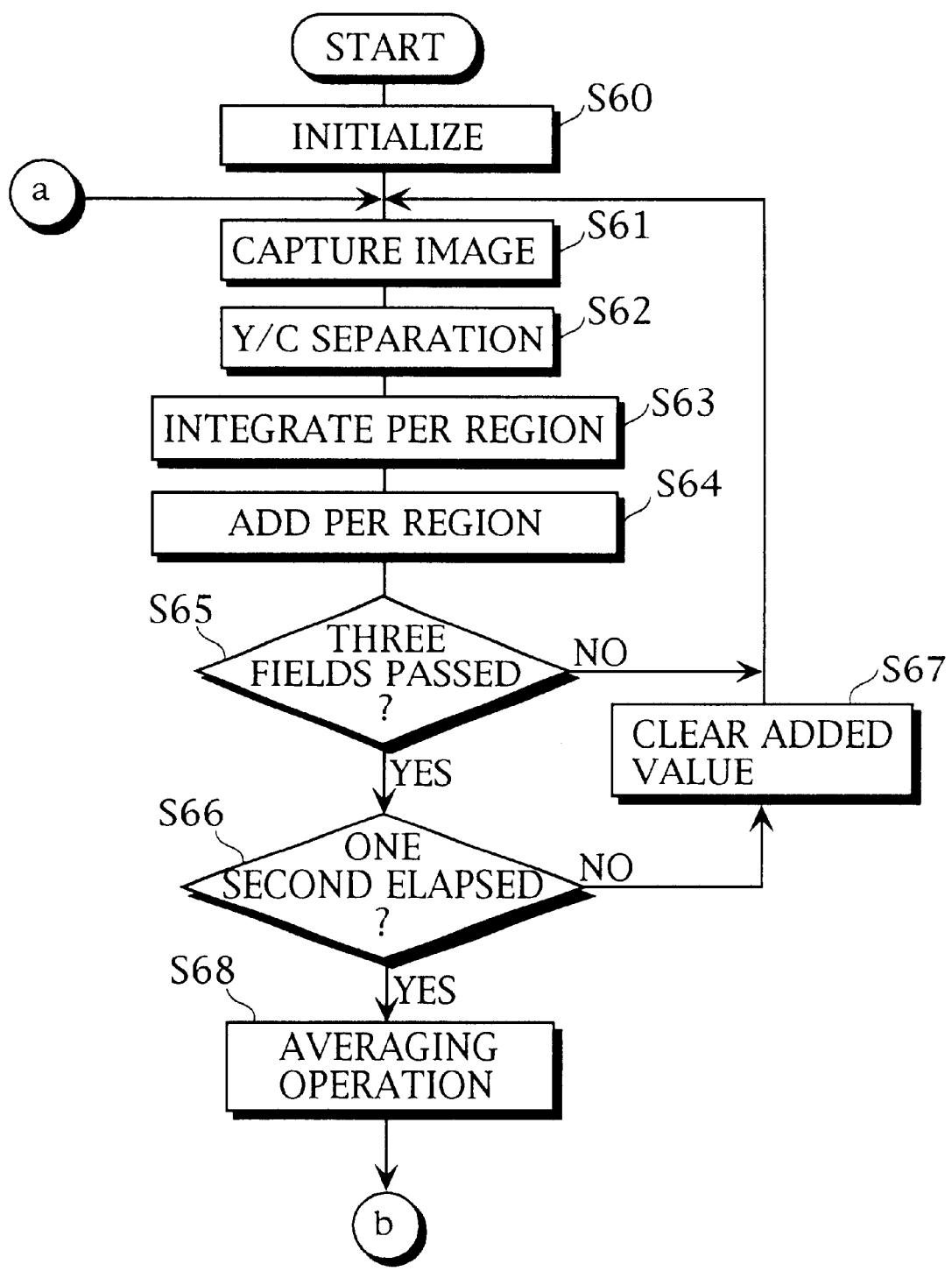
FIG. 13 is a flow chart showing an operation procedure taken by the abnormality detection apparatus according to the fourth embodiment.
Figure 14:
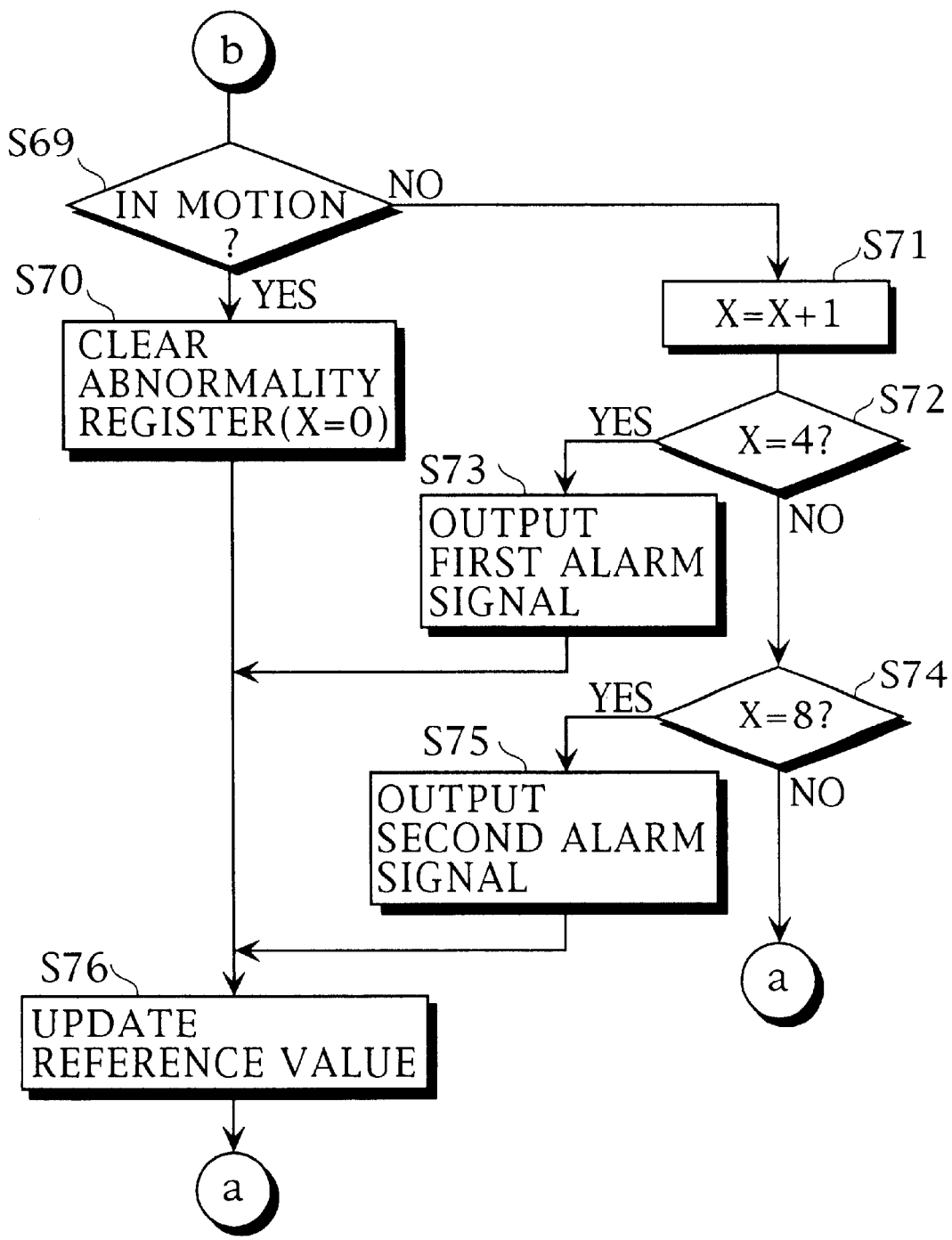
FIG. 14 is a flow chart showing the operation procedure taken by the abnormality detection apparatus according to the fourth embodiment.

FIGS. 13 and 14 show operations of the abnormality detection apparatus.

First, the apparatus is initialized (Step S60). Specifically, an initial reference value is established in the reference-value register 205. On the other hand, the abnormality register 207 is set to "0".

Next, an image of a scene in the room is captured into the pre-processing means 91 via the CCD 8 (Step S61). The image captured into the pre-processing means 91 is sent to the Y/C separation means 92 for Y/C separation (Step S62). The region integration means 93 integrates luminance signals of each of the feature-quantity calculation regions (Step S63).

Next, the 3-field adder means 201 of the microcomputer 94 performs the adding operation, retrieving the luminance integration values per feature-quantity calculation region from the region integration means 93 (Step S64). When three fields of images have been captured (Step S65), the control proceeds to Step S66. If three fields of images have not been captured (Step S65), the control returns to Step S61.

When the processings at Steps S61 to S65 have been cycled three times or the 3-field adder means 101 has added up the luminance integration values over three fields with respect to each of the feature-quantity calculation regions, the control proceeds to Step S66.

At Step S66, judgment is made as to whether or not one second has elapsed from the previous execution of Step S68 which will be described hereinlater. If it is determined that one second has not elapsed from the previous execution of step S38, Step S67 is executed to reset the added value given by the adder means 201 and the control returns to step S61 to restart the image capturing operation. If it is determined that one second has elapsed from the previous execution of Step S68, the control proceeds to Step S68. It is noted that when Step S65 gives a first "YES" after the start of the operations of the abnormality detection apparatus, the control proceeds from Step S66 to Step S68.

At Step S68, the averaging means 202 calculates a per-field luminance average for each of the feature-quantity calculation regions based on the 3-field luminance integration value per feature-quantity calculation region given by the adder means 201. The averaging means records the calculation results in the average register 203.

Figure 12:
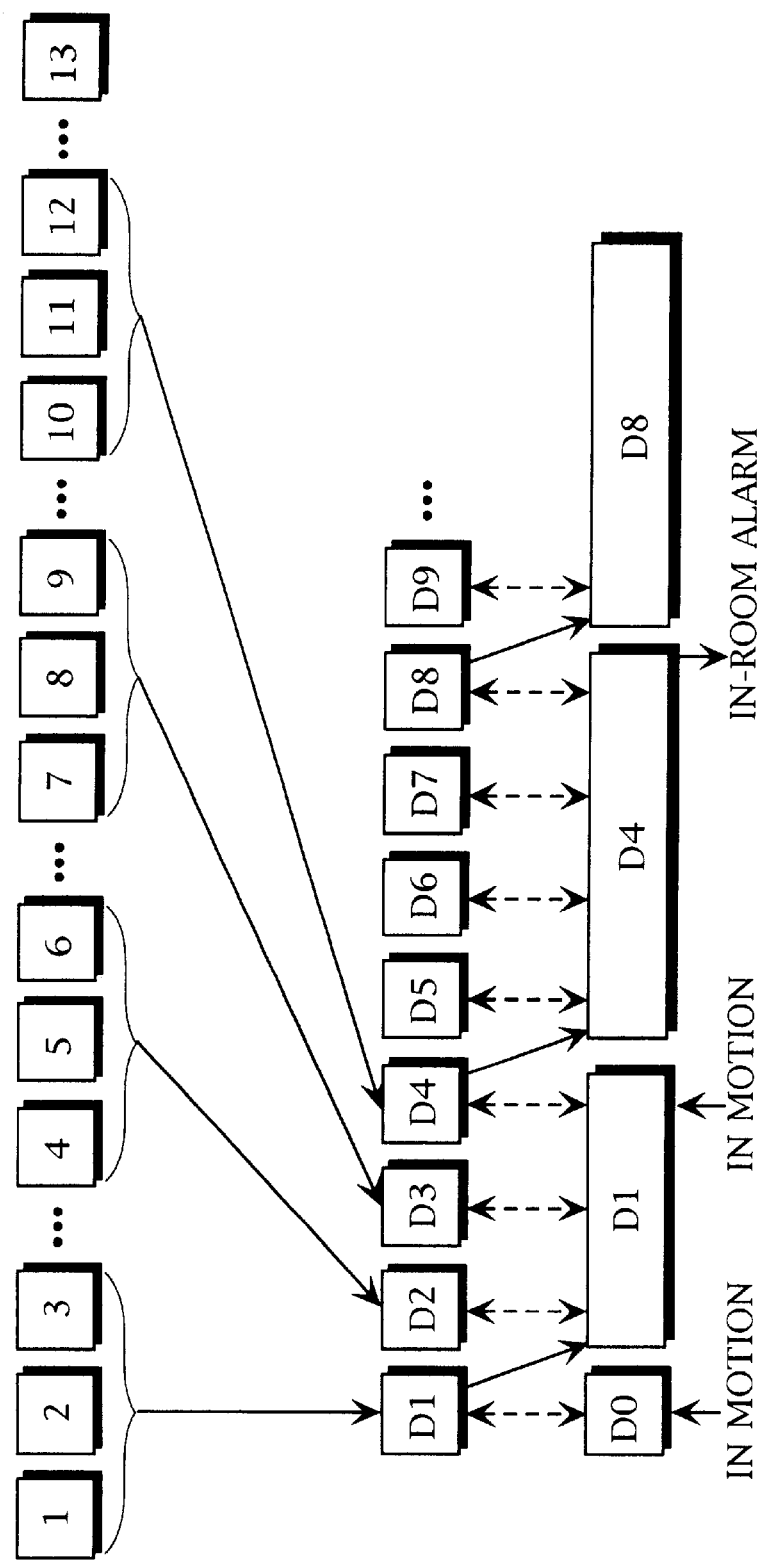
FIG. 12 is a time sequence chart explanatory of the operations of the abnormality detection apparatus according to the fourth embodiment.

Specifically, as shown in FIG. 12, a per-field luminance average D1 is calculated from integration values for three fields of luminance signals 1, 2, 3. After the lapse of one second, a per-field luminance average D2 is calculated from integration values for three fields of luminance signals 4, 5, 6. Subsequently, the same step is repeated at intervals of one second, thereby obtaining the per-field luminance average from the integration values for three fields of luminance signals.

Next, the abnormality detecting means 206 compares the reference value per feature-quantity calculation region recorded in the reference-value register 205 with the luminance average per feature-quantity calculation region recorded in the average register 203 so as to determine whether each of the feature-quantity calculation regions is varied in luminance or not. Based on the judgment results of the respective feature-quantity calculation regions, the detecting means determines whether the bath user is in motion or not (Step S69).

For instance, if three or more regions are varied in luminance, it is determined that the bath user is in motion. If the luminance variations are observed in less than three regions, the bath user is determined to be motionless. As shown in FIG. 12, whether the bath user is in motion or not is determined based on the reference value D0 and the average D1.

If the bath user is determined to be in motion, the abnormality detecting means clears the abnormality register 207, setting the content X of the abnormality register 207 to "0" (Step S70). Subsequently, the reference value is updated (Step S76). Specifically, a current average value in the average register 103 is recorded, as the new reference value, in the reference-value register 105 by the reference-value setting means 104. Subsequently, the control returns to Step S61 to restart the image capturing operation.

If the bath user is determined to be motionless, the abnormality detecting means increments the abnormality register 207 by "1" for the number of times X of abnormality detection (Step S71).

Then, the abnormality detecting means 206 determines whether the content X of the abnormality register 207 is "4" or not (Step S72). If X=4, the abnormality detecting means 206 causes the alarm means 208 to output the first alarm signal (Step S73). This triggers the first alarm device 10 for alerting the bath user. Then after updating the reference value (Step S76), the control returns to Step S61 to restart the image capturing operation.

If not X=4, the abnormality detecting means 206 determines whether the content X of the abnormality register 207 is "8" or not (Step S74). If X=8, the abnormality detecting means 206 causes the alarm means 208 to output the second alarm signal (Step S75) This triggers the second alarm device 11 for informing a person at place other than the bathroom (room), such as a kitchen, that the person in the bathroom has lapsed into the abnormal state. Then, after updating the reference value (Step S76), the control returns to Step S61 to restart the image capturing operation.

If not X=8, the control omits Step S76 for updating the reference value, returning to Step S61 to restart the image capturing operation.

As shown in FIG. 12, the luminance average D1 is first calculated and then compared with the reference value D0 so as to determine whether the bath user is in motion or not. If the bath user is determined to be in motion, the abnormality register 207 is cleared while the luminance average D1 is recorded as the reference value in the reference-value register 205. Subsequently, if the comparison between the luminance average D2 and the reference value D1 determines that the bath user is motionless, the content of the abnormality register 207 is incremented by "1". If the bath user is determined to be motionless, the reference value is not updated so that the reference value stays at D1. Subsequently, the luminance average D3 is compared with the reference value D1.

Thus, the reference value is updated when the bath user is determined to be in motion. On the other hand, the reference value is not updated when the bath user is determined to be motionless, provided that the reference value is updated if four successive motion judgments determine that the bath user is motionless.

The abnormal state of the person in the bathroom is detected by repeating Steps S60 to S76 in cycles. Particularly, this embodiment is adapted for adequate detection of even a slow motion of an elderly person, thereby accomplishing the detection of the abnormal state of such a person.

Although the foregoing second, third and fourth embodiments are adapted to detect the abnormality based on the time-variations of the luminance signal, the detection may be based on the time-variations of color difference signal. As mentioned supra, it is also possible to detect the abnormality based on the time-variations of both the luminance signal and the color difference signal.

What is claimed is:

1. An abnormality detection apparatus for detecting an event where a monitored object in a room has lapsed into an abnormal state, the apparatus comprising:

image pickup means for picking up an image of a scene in the room;

feature-quantity extraction means for extracting an image feature quantity from the image picked up by the image pickup means; and judgment means for determining whether the monitored object in the room has lapsed into the abnormal state or not based on the time-variations of the image feature quantity extracted by the feature-quantity extraction means.

2. The abnormality detection apparatus as claimed in claim 1, wherein the feature-quantity extraction means calculates the image feature quantity of each of plural feature-quantity calculation regions defined in one screen, the calculation performed on the feature-quantity calculation regions at predetermined time intervals, and wherein the judgment means determines whether the monitored object in the room has lapsed into the abnormal state or not based on the time-variations of the respective image feature quantities of the feature-quantity calculation regions.

3. The abnormality detection apparatus as claimed in claim 2, wherein the judgment means comprises:

means for judging the respective feature-quantity calculation regions as to whether the image feature quantity is time-varied or not, the judgment made on the calculation regions at predetermined time intervals;

means for determining whether the feature-quantity calculation regions determined to be time-varied in the image feature quantities are equal to or greater than a predetermined number or less than the predetermined number each time the judgment as to the time-variations of the image feature quantities is made; and means for determining that the monitored object has lapsed into the abnormal state when a state with less than the predetermined number of feature-quantity calculation regions determined to be time-varied in the image feature quantities has continued for a predetermined period of time.

4. The abnormality detection apparatus as claimed in claim 2, further comprising a first alarm device installed in the room and a second alarm device installed outside the room, wherein the judgment means comprises:
means for judging the respective feature-quantity calculation regions as to whether the image feature quantity is time-varied or not, the judgment made on the calculation regions at predetermined time intervals;

means for determining whether the feature-quantity calculation regions determined to be time-varied in the image feature quantities are equal to or greater than a predetermined number or less than the predetermined number each time the judgment as to the time-variations of the image feature quantities is made;

means for triggering the first alarm device when a state with less than the predetermined number of feature-quantity calculation regions determined to be time-varied in the image feature quantities has continued for a first predetermined period of time; and means for triggering the second alarm device when the state with less than the predetermined number of feature-quantity calculation regions determined to be time-varied in the image feature quantities has continued for a second predetermined period of time which is longer than the first predetermined period of time.

5. The abnormality detection apparatus as claimed in claim 2, wherein the judgment means comprises:

first judging means for judging the respective feature-quantity calculation regions as to whether the image feature quantity is time-varied or not, the judgment made on the calculation regions at predetermined time intervals;

second judging means for determining whether feature-quantity calculation regions determined to be time-varied in the image feature quantities are equal to or greater than a predetermined number or less than the predetermined number each time the judgment as to the time-variation of the image feature quantities is made; and third judging means for determining whether the monitored object has lapsed into the abnormal state or not based on a predetermined number of preceding judgment results given by the second judging means.

6. The abnormality detection apparatus as claimed in claim 2, further comprising a first alarm device installed in the room and a second alarm device installed outside the room, wherein the judgment means comprises:
first judging means for judging the respective feature-quantity calculation regions as to whether the image feature quantity is time-varied or not, the judgment made on the calculation regions at predetermined time intervals;

second judging means for determining whether the monitored object is in motion or not each time the judgment as to the time-variations of the image feature quantities is made, the judgment made based on whether the feature-quantity calculation regions determined to be time-varied in the image feature quantities are equal to or greater than a predetermined number or less than the predetermined number;

means for triggering the first alarm device when a first predetermined number of preceding judgment results given by the second judging means include not more than a first predetermined number of determinations that the monitored object is in motion; and means for triggering the second alarm device when a second predetermined number of preceding judgment results given by the second judging means include not more than a second predetermined number of determinations that the monitored object is in motion.

7. The abnormality detection apparatus as claimed in claim 1, wherein the feature-quantity extraction means calculates an average of image feature quantities for a predetermined number of fields with respect to each of plural feature-quantity calculation regions defined in one screen, the calculation performed on the calculation regions at predetermined time intervals; and the judgment means determines whether the monitored object in the room has lapsed into the abnormal state or not based on the time-variations of the respective average image feature quantities of the feature-quantity calculation regions.

8. The abnormality detection apparatus as claimed in claim 7, wherein the judgment means comprises:

means for judging the respective feature-quantity calculation regions as to whether the average image feature quantity is time-varied or not, the judgment made on the calculation regions at predetermined time intervals;

means for determining whether the feature-quantity calculation regions determined to be time-varied in the average image feature quantities are equal to or greater than a predetermined number or less than the predetermined number each time the judgment as to the time-variations of the average image feature quantities is made; and means for determining that the monitored object has lapsed into the abnormal state when a state with less than the predetermined number of feature-quantity calculation regions determined to be time-varied in the average image feature quantities has continued for a predetermined period of time.

9. The abnormality detection apparatus as claimed in claim 7, further comprising a first alarm device installed in the room and a second alarm device installed outside the room, wherein the judgment means comprises:
means for judging the respective feature-quantity calculation regions as to whether the average image feature quantity is time-varied or not, the judgment made on the calculation regions at predetermined time intervals;

means for determining whether the feature-quantity calculation regions determined to be time-varied in the average image feature quantities are equal to or greater than a predetermined number or less than the predetermined number each time the judgment as to the time-variations of the average image feature quantities is made;

means for triggering the first alarm device when a state with less than the predetermined number of feature-quantity calculation regions determined to be time-varied in the average image feature quantities has continued for a first predetermined period of time; and means for triggering the second alarm device when the state with less than the predetermined number of feature-quantity calculation regions determined to be time-varied in the average image feature quantities has continued for a second predetermined period of time which is longer than the first predetermined period of time.

10. An abnormality detection method for detecting an event where a monitored object in a room has lapsed into an abnormal state, the method comprising the steps of:

a first step of picking up an image of a scene in the room via an image pickup device;

a second step of extracting an image feature quantity from the image captured at the first step; and a third step of determining whether the monitored object in the room has lapsed into the abnormal state or not based on the time-variations of the image feature quantity extracted at the second step.

11. The abnormality detection method as claimed in claim 10, wherein the second step calculates an image feature quantity of each of plural feature-quantity calculation regions defined in one screen, the calculation performed on the calculation regions at predetermined time intervals, and wherein the third step determines whether the monitored object in the room has lapsed into the abnormal state or not based on the time-variations of the respective image feature quantities of the feature-quantity calculation regions.

12. The abnormality detection method as claimed in claim 11, wherein the third step comprises the steps of:

judging the respective feature-quantity calculation regions as to whether the image feature quantity is time-varied or not, the judgment made on the calculation regions at predetermined time intervals;

determining whether the feature-quantity calculation regions determined to be time-varied in the image feature quantities are equal to or greater than a predetermined number or less than the predetermined number each time the judgment as to the time-variations of the image feature quantities is made; and determining that the monitored object has lapsed into the abnormal state when a state with less than the predetermined number of feature-quantity calculation regions determined to be time-varied in the image feature quantities has continued for a predetermined period of time.

13. The abnormality detection method as claimed in claim 11, wherein a first alarm device is installed in the room while a second alarm device is installed outside the room, and wherein the third step comprises the steps of:

judging the respective feature-quantity calculation regions as to whether the image feature quantity is time-varied or not, the judgment made on the calculation regions at predetermined time intervals;

determining whether the feature-quantity calculation regions determined to be time-varied in the image feature quantities are equal to or greater than a predetermined number or less than the predetermined number each time the judgment as to the time-variations of the image feature quantities is made;

triggering the first alarm device when a state with less than the predetermined number of feature-quantity calculation regions determined to be time-varied in the image feature quantities has continued for a first predetermined period of time; and triggering the second alarm device when the state with less than the predetermined number of feature-quantity calculation regions determined to be time-varied in the image feature quantities has continued for a second predetermined period of time which is longer than the first predetermined period of time.

14. The abnormality detection method as claimed in claim 11, wherein the third step comprises:

Step 'a' of judging the respective feature-quantity calculation regions as to whether the image feature quantity is time-varied or not, the judgment made on the calculation regions at predetermined time intervals;

Step 'b' of determining whether the feature-quantity calculation regions determined to be time-varied in the image feature quantities are equal to or greater than a predetermined number or less than the predetermined number each time the judgment as to the time-variations of the image feature quantities is made; and Step 'c' of determining whether the monitored object has lapsed into the abnormal state or not based on a predetermined number of preceding judgment results given by Step 'b'.

15. The abnormality detection method as claimed in claim 11, wherein a first alarm device is installed in the room while a second alarm device is installed outside the room, and wherein the third step comprises:

Step 'a' of judging the respective feature-quantity calculation regions as to whether the image feature quantity is time-varied or not, the judgment made on the calculation regions at predetermined time intervals;

Step 'b' of determining whether the feature-quantity calculation regions determined to be time-varied in the image feature quantities are equal to or greater than a predetermined number or less than the predetermined number each time the judgment as to the time-variations of the image feature quantities is made, thereby determining whether the monitored object is in motion or not;

Step 'c' of triggering the first alarm device when a first predetermined number of preceding judgment results given by Step 'b' include not more than a first predetermined number of determinations that the monitored object is in motion; and Step 'd' of triggering the second alarm device when a second predetermined number of preceding judgment results given by Step 'b' include not more than a second predetermined number of determinations that the monitored object is in motion.

16. The abnormality detection method as claimed in claim 10, wherein the second step calculates an average of image feature quantities for a predetermined number of fields with respect to each of plural feature-quantity calculation regions defined in one screen, the calculation performed on the calculation regions at predetermined time intervals; and wherein the third step determines whether the monitored object in the room has lapsed into the abnormal state or not based on the time-variations of the respective average image feature quantities of the feature-quantity calculation regions.

17. The abnormality detection method as claimed in claim 16, wherein the third step comprises the steps of:

judging the respective feature-quantity calculation regions as to whether the average image feature quantity is time-varied or not, the judgment made on the calculation regions at predetermined time intervals;

determining whether the feature-quantity calculation regions determined to be time-varied in the average image feature quantities are equal to or greater than a predetermined number or less than the predetermined number each time the judgment as to the time-variations of the average image feature quantities is made; and determining that the monitored object has lapsed into the abnormal state when a state with less than the predetermined number of feature-quantity calculation regions determined to be time-varied in the average image feature quantities has continued for a predetermined period of time.

18. The abnormality detection method as claimed in claim 16, wherein a first alarm device is installed in the room while a second alarm device is installed outside the room, and wherein the third step comprises the steps of:

judging the respective feature-quantity calculation regions as to whether the average image feature quantity is time-varied or not, the judgment made on the calculation regions at predetermined time intervals;

determining whether the feature-quantity calculation regions determined to be time-varied in the average image feature quantities are equal to or greater than a predetermined number or less than the predetermined number each time the judgment as to the time-variations of the average image feature quantities is made; and triggering the first alarm device when a state with less than the predetermined number of feature-quantity calculation regions determined to be time-varied in the average image feature quantities has continued for a first predetermined period of time; and triggering the second alarm device when the state with less than the predetermined number of feature-quantity calculation regions determined to be time-varied in the average image feature quantities has continued for a second predetermined period of time which is longer than the first predetermined period of time.

* * * * *